(12) United States Patent
Jin et al.

(10) Patent No.: US 11,443,545 B2
(45) Date of Patent: Sep. 13, 2022

(54) SENSOR PIXEL CIRCUIT AND SENSOR DEVICE COMPRISING THE SAME

(71) Applicant: SILICON DISPLAY TECHNOLOGY, Yongin-si (KR)

(72) Inventors: Jong Woo Jin, Seoul (KR); Jin Hyeong Yu, Yongin-si (KR); Youn Duck Nam, Suwon-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 19 days.

(21) Appl. No.: 17/105,741

(22) Filed: Nov. 27, 2020

(65) Prior Publication Data

US 2021/0174045 A1 Jun. 10, 2021

(30) Foreign Application Priority Data

Dec. 6, 2019 (KR) ........................ 10-2019-0161934

(51) Int. Cl.
*G06V 40/13* (2022.01)

(52) U.S. Cl.
CPC ............................... *G06V 40/1306* (2022.01)

(58) Field of Classification Search
CPC .. G06V 40/1306; H04N 5/3698; H04N 5/378; H01L 27/14609
See application file for complete search history.

(56) References Cited

U.S. PATENT DOCUMENTS

| | | | |
|---|---|---|---|
| 10,791,292 B1* | 9/2020 | Geurts | H04N 5/379 |
| 2016/0148036 A1* | 5/2016 | Kim | G06V 40/1306 |
| | | | 382/124 |
| 2021/0191545 A1* | 6/2021 | Zhang | G06F 3/0446 |

FOREIGN PATENT DOCUMENTS

| | | | |
|---|---|---|---|
| CN | 113792698 A | * | 10/2021 |
| JP | 08-180173 | | 7/1996 |
| JP | 2016-009876 | | 1/2016 |
| KR | 10-1376228 | | 4/2014 |
| KR | 10-1596377 | | 2/2016 |
| KR | 10-1944059 | | 1/2019 |

* cited by examiner

*Primary Examiner* — Edward F Urban
*Assistant Examiner* — Wassim Mahrouka
(74) *Attorney, Agent, or Firm* — Lex IP Meister, PLLC

(57) ABSTRACT

A sensor pixel circuit may include: a photodiode to which a current flows according to incident light; a storage capacitor connected in parallel to the photodiode; a first transistor for connecting a bias voltage and the photodiode by a contact of a recognition object; and a second transistor for transmitting charges stored in the storage capacitor to a data line.

16 Claims, 13 Drawing Sheets

SENSOR PIXEL CIRCUIT AND SENSOR DEVICE COMPRISING THE SAME

CROSS-REFERENCE TO RELATED APPLICATION

This application claims priority to and the benefit of Korean Patent Application No. 10-2019-0161934 filed in the Korean Intellectual Property Office on Dec. 6, 2019, the entire contents of which are incorporated herein by reference.

BACKGROUND

(a) Technical Field

The present disclosure relates to a sensor pixel circuit and a sensor device including the same.

(b) Description of the Related Art

Conventional sensors use one of an optical type, a capacitive type, a resistive type, a heating detecting type, and an ultrasonic wave type. In the case of the optical type, sensing results may be distorted by an influence of external light. For example, as the external light becomes brighter, the recognition object sensed by the optical type sensor is sensed to be bright, so the recognition object is inaccurately sensed.

The above information disclosed in this Background section is only for enhancement of understanding of the background of the invention, and therefore it may contain information that does not form the prior art that is already known in this country to a person of ordinary skill in the art.

SUMMARY

The present invention has been made in an effort to provide a sensor pixel circuit and a sensor device for accurately sensing a recognition object.

An embodiment of the present invention provides a sensor pixel circuit including: a photodiode to which a current flows according to incident light; a storage capacitor connected in parallel to the photodiode; a first transistor for connecting a bias voltage and the photodiode by a contact of a recognition object; and a second transistor for transmitting charges stored in the storage capacitor to a data line.

The first transistor may include a first end connected to an anode of the photodiode and a second end for receiving the bias voltage, a sensing electrode connected to a control end of the first transistor may be further included, and the sensing electrode and the recognition object may form a sensing capacitor by a contact of the recognition object.

The sensor pixel circuit may further include a third transistor for resetting a voltage at a first node on which the first end of the first transistor is connected to an anode of the photodiode with a reset voltage for making the photodiode an open circuit.

The third transistor may include a first end connected to the first node and a second end for receiving the reset voltage, and the current flowing to the photodiode may be charged in the storage capacitor by a contact of the recognition object for a period from a turn-off time of the third transistor to a turn-on time of the second transistor after the turn-off time of the third transistor.

The sensor pixel circuit may further include a fourth transistor for resetting a voltage at a second node on which a control end of the first transistor is connected to the sensing electrode.

The fourth transistor may include a first end connected to the second node and a second end for receiving a reset voltage, and for an On period of the fourth transistor, the second node may become the reset voltage, and the first transistor may be switched according to a pulse signal supplied to the recognition object by a contact of the recognition object.

When the reset voltage is an On level voltage of the first transistor, the second node may be reset with the reset voltage and the pulse signal may be changed to a level for turning off the first transistor.

When the reset voltage is an Off level voltage of the first transistor, the second node may be reset with the reset voltage and the pulse signal may be changed to a level for turning on the first transistor.

The sensor pixel circuit may further include a first storage capacitor including a first electrode connected to the second node and a second electrode for receiving a DC voltage.

The sensor pixel circuit may further include a coupling capacitor including a first electrode connected to the second node and a second electrode for receiving a pulse signal.

The fourth transistor may include a first end connected to the second node and a second end for receiving a reset voltage, and for an On period of the fourth transistor, the second node may become the reset voltage and the first transistor may be switched according to the pulse signal.

When the reset voltage has an On level voltage of the first transistor, the second node may be reset with the reset voltage and the pulse signal may be changed to a level for turning off the first transistor.

When the reset voltage is an Off level voltage of the first transistor, the second node may be reset with the reset voltage and the pulse signal may be changed to a level for turning on the first transistor.

Another embodiment of the present invention provides a sensor device including: a sensor panel including a plurality of sensor pixels; a gate driving circuit for supplying a scan signal to a plurality of sensor pixel rows through a plurality of scan lines; and a sensor signal lead out circuit for receiving a plurality of data signals supplied from the sensor pixels through a plurality of data lines. One sensor pixel circuit of the sensor pixels may include a photodiode to which a current flows according to incident light, a storage capacitor connected in parallel to the photodiode, a first transistor for connecting a bias voltage and the photodiode by a contact of a recognition object, and a second transistor synchronized with a scan signal transmitted through a corresponding one of the scan lines and transmitting charges stored in the storage capacitor to a corresponding one of the data lines.

The sensor pixel circuit may further include a third transistor for resetting a voltage at a second node on which a control end of the first transistor is connected to the sensing electrode, and a coupling capacitor including a first electrode connected to the second node and a second electrode for receiving a pulse signal.

The sensor device may further include a plurality of pulse signal lines for supplying corresponding pulse signals to the respective sensor pixel rows.

The sensor pixel circuit and the sensor device for accurately sensing a recognition object are provided.

DETAILED DESCRIPTION OF THE EMBODIMENTS

Figure 1:
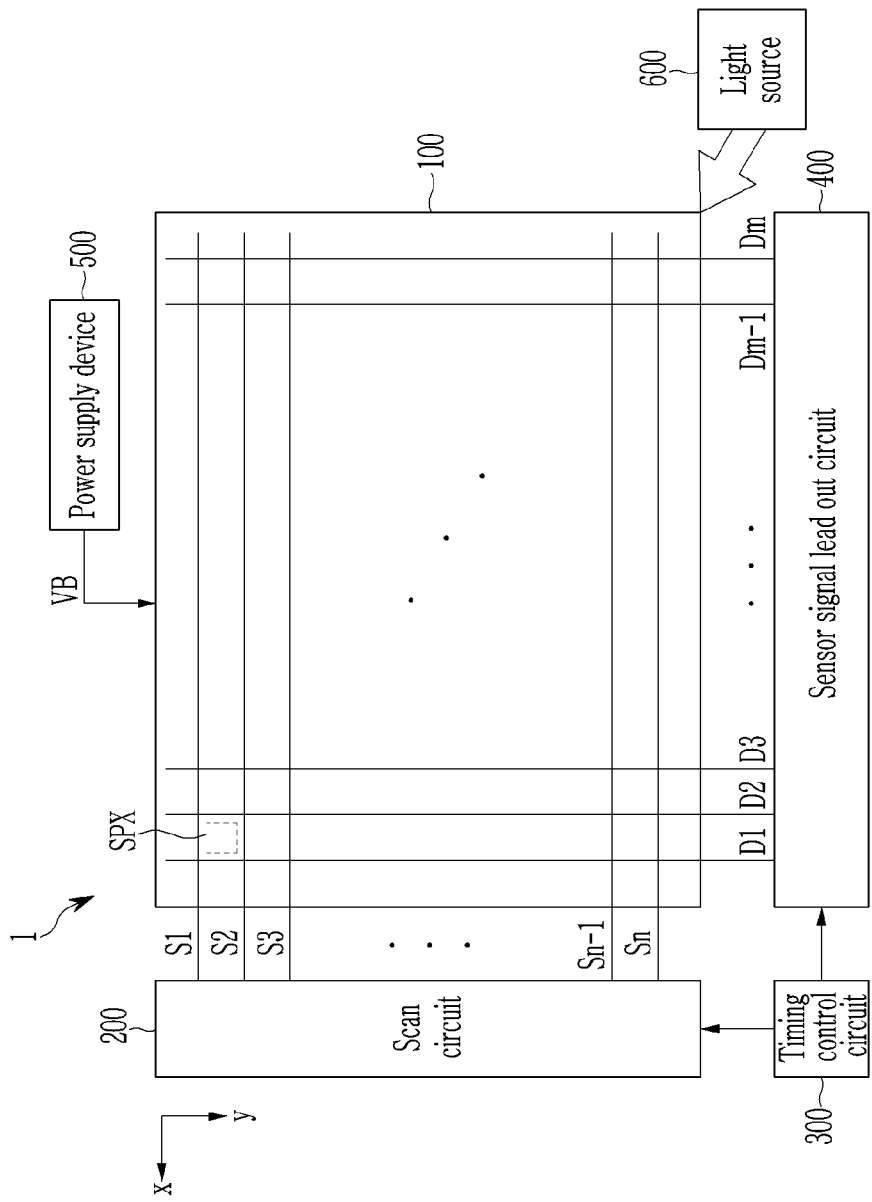
FIG. 1 shows a sensor device according to an embodiment.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected or coupled to another component without the other component intervening therebetween.

It is to be understood that terms such as "including," "having," etc. are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 shows a sensor device according to an embodiment.

As shown in FIG. 1, the sensor device 1 includes a sensor panel 100, a scan circuit 200, a timing control circuit 300, a sensor signal lead out circuit 400, a power supply device 500, and a light source 600.

The sensor panel 100 includes a plurality of scan lines (S1 to Sn), a plurality of data lines (D1 to Dm), and a plurality of sensor pixels (SPX).

Various embodiments on a plurality of sensor pixels (SPX) will be described in latter portions of the present specification.

A plurality of scan lines (S1 to Sn) extend in a first direction (an X direction in FIG. 1), and are arranged in a second direction (a Y direction in FIG. 2) crossing the first direction. Scan signals corresponding to a plurality of respective sensor pixel rows are transmitted through a plurality of scan lines (S1 to Sn).

FIG. 1 illustrates that one scan line corresponds to one sensor pixel row, and the sensor pixel may be operable by at least one scan signal. A number of the scan lines connected to one sensor pixel row is variable according to the scan signal needed for operating the sensor pixel.

The power supply device 500 generates a bias voltage (VB) for driving the sensor pixel circuit (SPX) and supplies it. The power supply device 500 may adjust a size of the data signal generated by the sensor pixel by adjusting a level of the bias voltage (VB).

A plurality of data lines (D1 to Dm) extend in the second direction, and are arranged in the first direction. Data signals of a plurality of sensor pixels are transmitted to the sensor signal lead out circuit 400 through the data lines (D1 to Dm).

The sensor pixels (SPX) may be respectively positioned in a region defined by two scan lines and two data lines. The sensor pixels (SPX) may respectively transmit a data signal to the corresponding data lines in synchronization with the scan signal transmitted through the corresponding scan line.

The scan circuit 200 generates a plurality of scan signals, and transmits them to a plurality of scan lines (S1 to Sn).

The sensor signal lead out circuit 400 may receive a plurality of data signals through a plurality of data lines (D1 to Dm), and may generate information on a recognition object according to a plurality of data signals.

The timing control circuit 300 may generate control signals (CONT1 and CONT2) for controlling operations of the scan circuit 200 and the sensor signal lead out circuit 400.

The scan circuit 200 may generate a plurality of scan signals according to the control signal (CONT1). The sensor signal lead out circuit 400 may receive a plurality of data signals in synchronization with the time when a plurality of data signals are transmitted through a plurality of data lines (D1 to Dm) according to the control signal (CONT2), and may perform signal processing so as to generate information on the recognition object.

The light source 600 provides light for sensing a recognition object according to an optical method. The light source 600 may be positioned on a rear side of the sensor panel 100 and may provide light to a front side.

Figure 2:
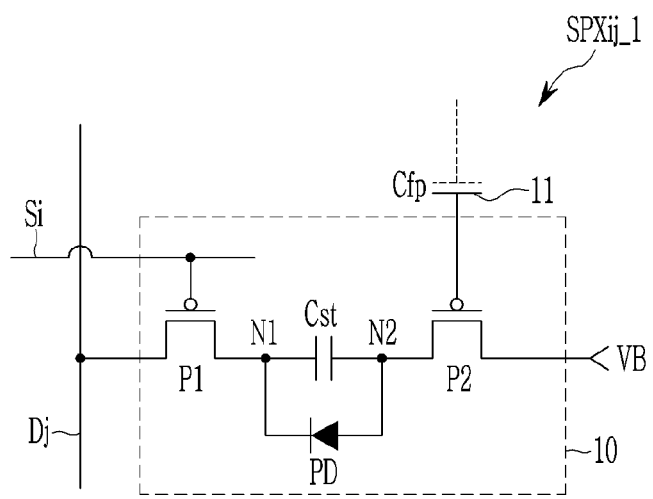
FIG. 2 shows a circuit diagram of a sensor pixel according to an embodiment.

FIG. 2 shows a circuit diagram of a sensor pixel according to an embodiment.

FIG. 2 illustrates a sensor pixel (SPXij_1) positioned in an i-th row and a j-th column. The sensor pixels on other positions may include the same configuration as that shown in FIG. 2, and respective constituent elements may be connected as shown in FIG. 2.

The sensor pixel (SPXij_1) includes a sensing electrode 11 and a sensor pixel circuit 10.

The sensor pixel circuit 10 includes two transistors (P1 and P2), a photodiode (PD), and a storage capacitor (Cst).

The transistor P2 includes a first end connected to a node N2, a second end for receiving the bias voltage (VB), and a gate connected to the sensing electrode 11.

The sensing electrode 11 controls a turned-on state of the photodiode (PD) according to a contacting state of the recognition object. For example, the sensing electrode 11 may control supply of the bias voltage (VB) to the sensor pixel circuit 10 according to a contacting state of the recognition object.

When a fingerprint that is a recognition object contacts the sensing electrode 11, and a ridge of the fingerprint forms a sensing capacitor (Cfp) with the sensing electrode 11, the sensing electrode 11 connected to the gate of the transistor P2 is discharged, and the transistor P2 is turned on. The bias voltage (VB) may then be supplied to the node N2.

The photodiode (PD) and the storage capacitor (Cst) are connected between the node N1 and the node N2. The photodiode (PD) includes a cathode connected to the node N1, and an anode connected to the node N2. When the bias voltage (VB) is supplied to the photodiode (PD), the photodiode (PD) has different flowing currents according to incident light. Light supplied from the light source 600 may be reflected from the recognition object, and may be input to the photodiode (PD). The current flowing to the photodiode (PD) becomes different depending on the light that is incident to the photodiode (PD), so an amount of charges stored in the storage capacitor (Cst) becomes different. When the bias voltage (VB) is a negative voltage, the photodiode (PD) may have different flowing Off currents depending on the incident light.

For example, when the fingerprint is recognized, in the case of a ridge of the fingerprint, the ridge of the fingerprint is closely attached to the sensor panel 100 so the amount of the light reflected to the sensor pixel (SPXij_1) from the light source 600 is big, and in the case of a valley of the fingerprint, the amount of light reflected to the sensor pixel (SPXij_1) from the light source 600 is relatively small because of a space between the valley of the fingerprint and the sensor panel 1. Therefore, the current flowing to the photodiode (PD) from the ridge of the fingerprint is greater than the current flowing to the photodiode (PD) from the valley of the fingerprint. The bigger the current flowing to the photodiode (PD) is, the more the voltage charged in the storage capacitor (Cst) increases, so the voltage at the node N1 may increase.

The transistor P1 includes a gate connected to the corresponding scan line (Si), and respective ends connected to between the corresponding data line (Dj) and the node N1. When the transistor P1 is turned on by the scan signal supplied through the scan line (Si), the charges stored in the storage capacitor (Cst) flow to the sensor signal lead out circuit 400 through the data line (Dj). A voltage of the data line (Dj) is maintained at a predetermined voltage by the sensor signal lead out circuit 400, and the voltage at the node N1 may be reset with the voltage of the data line (Dj) for an On period of the transistor P1.

Figure 3:
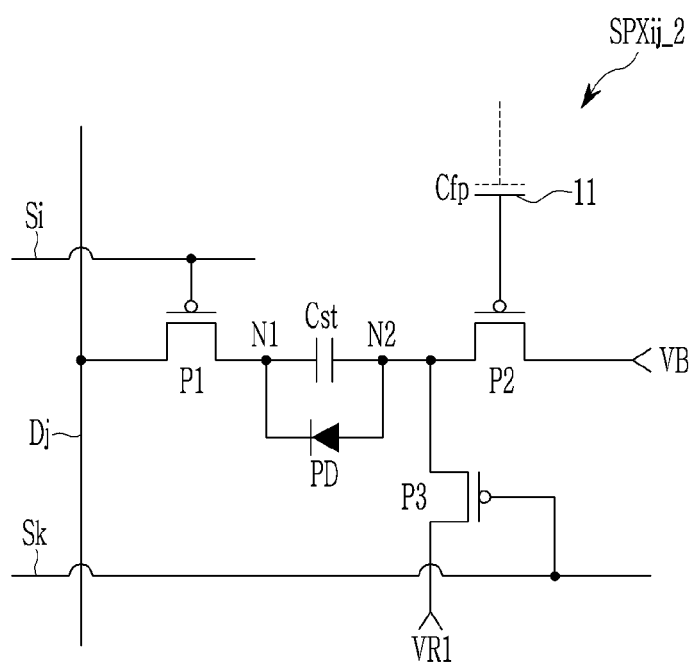
FIG. 3 shows a circuit diagram of a sensor pixel according to an embodiment.

FIG. 3 shows a circuit diagram of a sensor pixel according to an embodiment.

FIG. 3 illustrates a sensor pixel (SPXij_2) positioned in the i-th row and the j-th column. The sensor pixels on other positions may include the same configuration as that shown in FIG. 3, and respective constituent elements may be connected as shown in FIG. 3. Hereafter, an On level represents a voltage at the level for turning on a transistor, and an Off level signifies a voltage at the level for turning off the transistor.

The sensor pixel (SPXij_2) further includes a transistor P3, compared to the sensor pixel (SPXij_1) described with reference to FIG. 2. The transistor P3 includes a gate connected to a scan line (Sk), a first end connected to the node N2, and a second end for receiving a reset voltage VR1. A scan signal (S[k]) supplied through the scan line (Sk) is different from the scan signal (S[i]) supplied through the scan line (Si). A time (an accumulated time hereinafter) when the sensor pixel (SPXij_2) is exposed to light and the storage capacitor (Cst) is charged by the current flowing to the photodiode (PD) may be adjusted by the scan signal (S[k]).

For example, when the scan signal (S[k]) has the On level, the transistor P3 is turned on, a reset voltage VR1 is applied to the node N2, and the voltage at the node N2 is reset by the reset voltage VR1. In this instance, the reset voltage VR1 may be an open-circuit voltage for making the photodiode (PD) an open circuit. When the transistor P2 is in an On state by a contact of the recognition object, the charges caused by the light that is incident to the photodiode (PD) may be stored in the capacitor (Cst) for the accumulated time from the time when the scan signal (S[k]) becomes the Off level to the time when the scan signal (S[i]) becomes the On level. When the scan signal (S[k]) is a previous scan signal (S[i−1]) to the scan signal (S[i]), the accumulated time may be the shortest, and when the scan signal (S[k]) is a scan signal (S[i+1]) next to the scan signal (S[i]), the accumulated time may be the longest.

When the transistor P2 does not contact the recognition object and is in an Off state, no current flows to the photodiode (PD) that becomes an open circuit, so no charges are stored in the storage capacitor (Cst).

Figure 4:
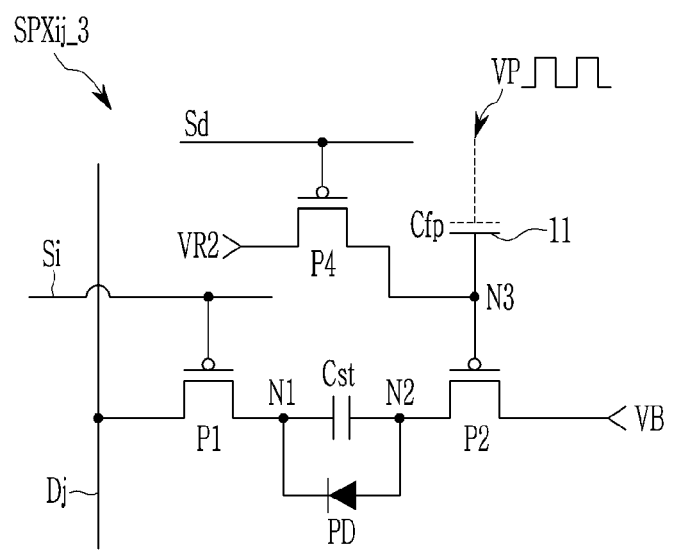
FIG. 4 shows a sensor pixel circuit according to an embodiment.

FIG. 4 shows a sensor pixel circuit according to an embodiment.

FIG. 4 illustrates a sensor pixel (SPXij_3) positioned in the i-th row and the j-th column. The sensor pixels on other positions may include the same configuration as that shown in FIG. 4, and respective constituent elements may be connected as shown in FIG. 4.

The sensor pixel (SPXij_3) further includes a transistor P4, compared to the sensor pixel (SPXij_1) shown in FIG. 2. The transistor P4 includes a gate connected to the scan line (Sd), a first end connected to the node N3, and a second end for receiving the reset voltage VR2. A scan signal (S[d]) supplied through the scan line (Sd) is different from the scan signal (S[i]) supplied through the scan line (Si). When the transistor P4 is turned on by the scan signal (S[d]), the node N3 is reset with the reset voltage VR2. The On level time of the scan signal (S[d]) may be different from the On-level time of the scan signal (S[i]). For example, the scan signal (S[d]) may enter the On level in advance of the scan signal (S[i]).

In an embodiment described with reference to FIG. 4, a pulse signal (VP) is applied to the recognition object. An operation of the sensor pixel shown in FIG. 4 will now be described with reference to a waveform diagram of FIG. 5.

Figure 5:
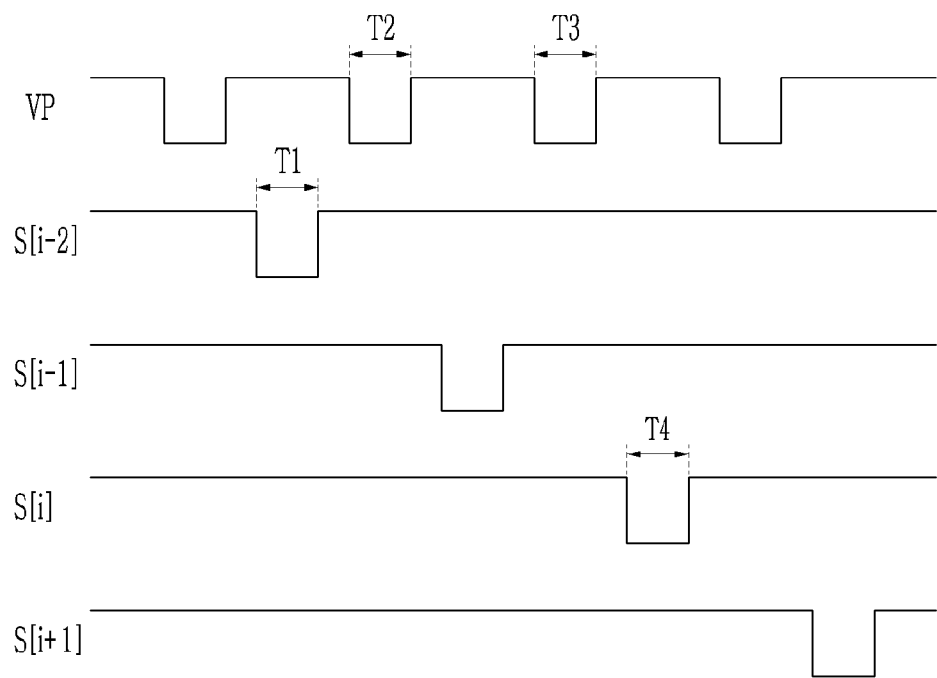
FIG. 5 shows a waveform diagram of a scan signal and a pulse signal according to an embodiment.

FIG. 5 shows a waveform diagram of a scan signal and a pulse signal according to an embodiment.

Referring to FIG. 5, a scan signal (S[i–2]) may be a scan signal (S[d]). This is an example for describing an embodiment, and the present disclosure is not limited thereto.

For an On-level period T1 of the scan signal (S[i–2]), the transistor P4 is turned on, and the reset voltage VR2 at the Off level is applied to the node N3. The transistor P2 is turned off by the reset voltage VR2 at the Off level. No bias voltage (VB) is then supplied to the photodiode (PD), so no current flows to the photodiode (PD).

When the recognition object contacts the sensor pixel (e.g., when the ridge of the fingerprint contacts the sensor pixel), a sensing capacitor (Cfp) is formed. For periods T2 and T3 in which a pulse signal (VP) supplied to the recognition object has a low level, the transistor P2 is turned on, and the bias voltage (VB) is supplied to the photodiode (PD). For the periods T2 and T3 in which the pulse signal (VP) has a low level, the current flowing to the photodiode (PD) is charged in the storage capacitor (Cst).

When the recognition object does not contact the sensor pixel (e.g., the valley of the fingerprint contacts the sensor pixel), the transistor P2 is in the Off state by the reset voltage VR2 at the Off level, so the bias voltage (VB) is not supplied to the photodiode (PD), no current flows to the photodiode (PD), and no charges are stored in the storage capacitor (Cst).

The charges stored in the storage capacitor (Cst) are transmitted to the sensor signal lead out circuit 400 through the data line (Dj) for the period T4 in which the scan signal (S[i]) is at the On level, and the node Ni is reset with the voltage of the data line (Dj). When the reset voltage VR2 is at the Off level, the amount of stored charges exist when the recognition object contacts it, so a difference between the data signals according to a contacting state increases, and a clear image may be acquired.

The method for driving a sensor pixel circuit described with reference to FIG. 5 may be suitable for the optical sensing mechanism in a non total internal reflection (TIR) type (diffuse reflectance) by which more light comes from the ridge of the fingerprint and less light comes from the valley of the fingerprint when the recognition object is the fingerprint.

Figure 6:
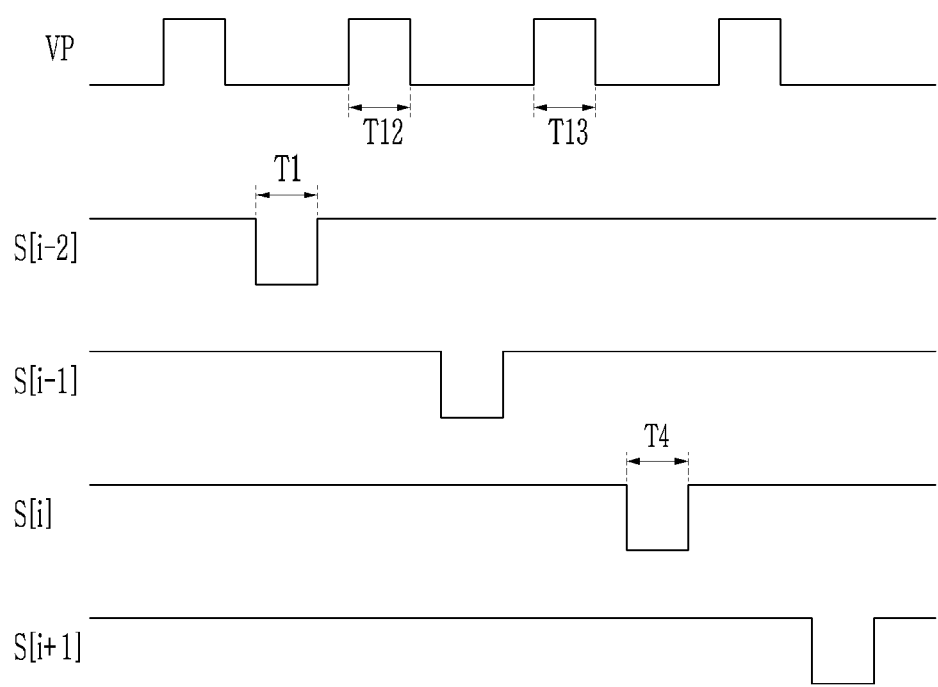
FIG. 6 shows a waveform diagram of a scan signal and a pulse signal according to an embodiment.

FIG. 6 shows a waveform diagram of a scan signal and a pulse signal according to an embodiment.

FIG. 6 illustrates waveforms of a scan signal and a pulse signal when the reset voltage VR2 is at the On level. The waveform of the pulse signal (VP) is different from the case when the reset voltage VR2 is at the Off level.

Referring to FIG. 6, the scan signal (S[i–2]) may be the scan signal (S[d]). This is an example for describing an embodiment, and the present disclosure is not limited thereto.

For the On-level period T1 of the scan signal (S[i–2]), the transistor P4 is turned on, and the reset voltage VR2 at the On level is applied to the node N3. The transistor P2 is turned on by the reset voltage VR2 at the On level. The bias voltage (VB) is supplied to the photodiode (PD), and the current flows to the photodiode (PD).

When the recognition object contacts the sensor pixel to form a sensing capacitor (Cfp), the transistor P2 is turned off for the periods T12 and T13 in which the pulse signal (VP) supplied to the recognition object has a high level, so no bias voltage (VB) is supplied to the photodiode (PD), and no current flows to the photodiode (PS). For the periods T12 and T13 in which the pulse signal (VP) has a high level, no current flows to the photodiode (PD), so no charges are stored in the storage capacitor (Cst).

When the recognition object does not contact the sensor pixel, the transistor P2 is in the On state by the reset voltage (VR) at the On level, so the voltage (VB) is continuously supplied to the photodiode (PD) in the case of a bias, and the current continuously flows to the photodiode (PD).

For the period T4 in which the scan signal (S[i]) is at the On level, the charges stored in the storage capacitor (Cst) are transmitted to the sensor signal lead out circuit 400 through the data line (Dj), and the node N1 is reset with the voltage of the data line (Dj). When the reset voltage VR2 is at the On level, the amount of stored charges when the recognition object does not contact the sensor pixel may be greater than the amount of stored charges when the recognition object contacts it. Therefore, the difference between the data signals according to the contacting state increases to acquire a clear image.

The method for driving a sensor pixel circuit described with reference to FIG. 6 may be suitable for the optical sensing mechanism in a total internal reflection (TIR) type by which less light comes from the ridge of the fingerprint and more light comes from the valley of the fingerprint when the recognition object is the fingerprint.

Figure 7:
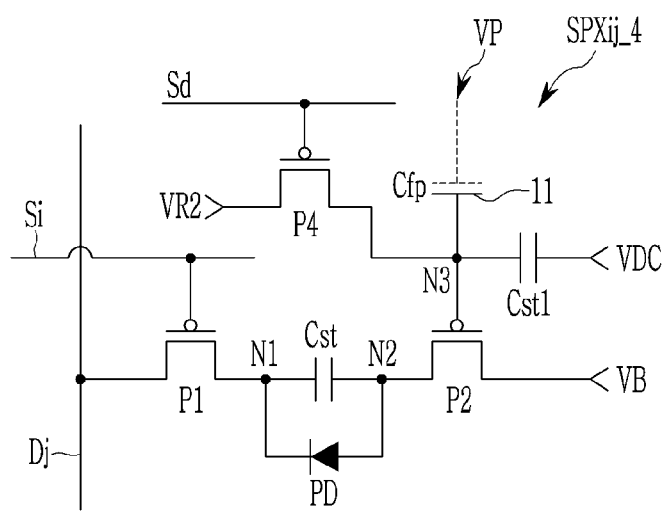
FIG. 7 shows a sensor pixel circuit according to an embodiment.

FIG. 7 shows a sensor pixel circuit according to an embodiment.

FIG. 7 illustrates a sensor pixel (SPXij_4) positioned in the i-th row and the j-th column. The sensor pixels on other positions may include the same configuration as that shown in FIG. 7, and respective constituent elements may be connected as shown in FIG. 7.

The sensor pixel (SPXij_4) further includes a storage capacitor Cst1, compared to the sensor pixel (SPXij_3) described with reference to FIG. 4. A first electrode of the storage capacitor Cst1 is connected to the node N3, and a DC voltage (VDC) is supplied to the second electrode, so the voltage at the node N3 is maintained by the storage capacitor Cst1. The DC voltage (VDC) may be equivalent to one of the bias voltage (VB), the reset voltages VR1 and VR2, and the ground voltage supplied to the sensor pixel circuit (SPXij_4), or may be a voltage at another level.

Capacitance connected to the node N3 increases, variation of the voltage at the node N3 is small, so the voltage at the node N3 may be better maintained than in the sensor pixel circuit shown in FIG. 2 to FIG. 4.

An operation of the sensor pixel circuit (SPXij_4) will now be described with reference to FIG. 5 and FIG. 6.

Referring to FIG. 5, the scan signal (S[i–2]) may be the scan signal (S[d]). For the On-level period T1 of the scan signal (S[i–2]), the transistor P4 is turned on, and the reset voltage VR2 at the Off level is applied to the node N3. The transistor P2 is turned off by the reset voltage VR2 at the Off level. The bias voltage (VB) is then not supplied to the photodiode (PD), so no current flows to the photodiode (PD).

When the recognition object contacts the sensor pixel to form a sensing capacitor (Cfp), the transistor P2 is turned on for the period T2 in which the pulse signal (VP) supplied to the recognition object has a low level, and the bias voltage (VB) is supplied to the photodiode (PD). For the period T2 in which the pulse signal (VP) has a low level, the current flowing to the photodiode (PD) is charged in the storage capacitor (Cst). In this instance, the On period of the transistor T2 may be further extended by the storage capacitor Cst1 by a predetermined period Δt1 caused by an increase of capacitance. The period for the current to flow to the photodiode (PD) also extends by the period Δt1, so the charges stored in the storage capacitor (Cst) may further increase. For the period T3 in which the pulse signal (VP) has a low level, the period in which the current flows to the photodiode (PD) further extends by the period Δt1 according to the same method, so a further amount of charges may be stored in the storage capacitor (Cst).

For the period T4 in which the scan signal (S[i]) is at the On level, the charges stored in the storage capacitor (Cst) are transmitted to the sensor signal lead out circuit 400 through the data line (Dj), and the node N1 is reset with the voltage of the data line (Dj). When the reset voltage VR2 is at the Off level, the amount of stored charges exist only when the recognition object contacts it, so the difference between the data signals according to the contacting state increases and the clear image is acquired. In addition, the difference between the data signals may be further increased because of the increase of the On period of the transistor P2 in the sensor pixel circuit described with reference to FIG. 7.

Referring to FIG. 6, the scan signal (S[i−2]) may be a scan signal (S[d]). For the On-level period T1 of the scan signal (S[i−2]), the transistor P4 is turned on, and the reset voltage VR2 at the On level is applied to the node N3. The transistor P2 is turned on by the reset voltage VR2 at the On level. The bias voltage (VB) is then applied to the photodiode (PD), and the current flows to the photodiode (PD).

When the recognition object contacts the sensor pixel to form a sensing capacitor (Cfp), the transistor P2 is turned off for the period T12 in which the pulse signal (VP) supplied to the recognition object has a high level, no bias voltage (VB) is supplied to the photodiode (PD), and no current flows to the photodiode (PD). In this instance, the Off period of the transistor T2 may be extended by the storage capacitor Cst1 by a predetermined period Δt2 caused by the increase of capacity. The period in which no current flows to the photodiode (PD) is further extended by the period Δt2, so charges stored in the storage capacitor (Cst) may be further reduced. For the period T13 in which the pulse signal (VP) has a high level, the period in which no current flows to the photodiode (PD) is also extended by the period Δt2 in a like manner, so the charges stored in the storage capacitor (Cst) may be reduced.

For the period T4 in which the scan signal (S[i]) is at the On level, the charges stored in the storage capacitor (Cst) are transmitted to the sensor signal lead out circuit 400 through the data line (Dj), and the node N1 is reset with the voltage of the data line (Dj). When the reset voltage VR2 is at the On level, the amount of the stored charges when the recognition object does not contact the sensor pixel may be greater than the amount of the stored charges when the recognition object contacts it. Therefore, the difference between the data signals according to the contacting state further increases to acquire a clear image.

Figure 8:
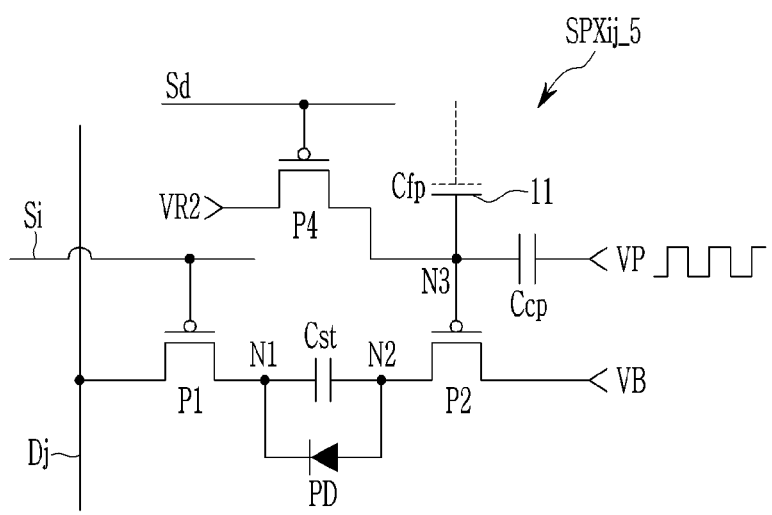
FIG. 8 shows a sensor pixel circuit according to an embodiment.

FIG. 8 shows a sensor pixel circuit according to an embodiment.

FIG. 8 illustrates a sensor pixel (SPXij_5) positioned in the i-th row and the j-th column. The sensor pixels on other positions may include the same configuration as that shown in FIG. 8, and respective constituent elements may be connected as shown in FIG. 8.

Regarding the sensor pixel circuit (SPXij_5), the pulse signal (VP) may be applied to a coupling capacitor (Ccp). The coupling capacitor (Ccp) includes a first electrode connected to the node N3, and a second electrode for receiving the pulse signal (VP).

An operation of the sensor pixel circuit (SPXij_5) will now be described with reference to FIG. 5 and FIG. 6.

Referring to FIG. 5, the scan signal (S[i−2]) may be a scan signal (S[d]). For the On-level period T1 of the scan signal (S[i−2]), the transistor P4 is turned on, and the reset voltage VR2 at the Off level is applied to the node N3. The transistor P2 is turned off by the reset voltage VR2 at the Off level. The bias voltage (VB) is then not supplied to the photodiode (PD), so no current flows to the photodiode (PD).

When the recognition object does not contact the sensor pixel, the voltage at the node N3 is changed by the pulse signal (VP). That is, for the periods T2 and T3 in which the pulse signal (VP) has a low level, the transistor P2 is turned on, and the bias voltage (VB) is supplied to the photodiode (PD). For the periods T2 and T3 in which the pulse signal (VP) has a low level, the current flowing to the photodiode (PD) is stored in the storage capacitor (Cst).

When the recognition object contacts the sensor pixel, the voltage at the node N3 is less influenced by the pulse signal (VP) than the case in which the recognition object does not contact it. The transistor P2 may be maintained at the Off state by the reset voltage VR2 at the Off level. The bias voltage (VB) is not supplied to the photodiode (PD), so no current flows to the photodiode (PD) and no charges are stored in the storage capacitor (Cst).

For the period T4 in which the scan signal (S[i]) is at the On level, the charges stored in the storage capacitor (Cst) are transmitted to the sensor signal lead out circuit 400 through the data line (Dj), and the node N1 is reset with the voltage of the data line (Dj). When the reset voltage VR2 is at the Off level, the amount of stored charges exist when the recognition object does not contact it, so a difference between the data signals according to a contacting state increases, and a clear image may be acquired.

The method for driving a sensor pixel circuit (SPXij_5) described with reference to FIG. 5 may be suitable for the optical sensing mechanism in a total internal reflection (TIR) type by which less light comes from the ridge of the fingerprint and more light comes from the valley of the fingerprint when the recognition object is the fingerprint.

Referring to FIG. 6, the scan signal (S[i−2]) may be the scan signal (S[d]). For the On-level period T1 of the scan signal (S[i−2]), the transistor P4 is turned on, and the reset voltage VR2 at the On level is applied to the node N3. The transistor P2 is turned on by the reset voltage VR2 at the On level. The bias voltage (VB) is then supplied to the photodiode (PD), so the current flows to the photodiode (PD).

When the recognition object does not contact the sensor pixel, the voltage at the node N3 is changed by the pulse signal (VP). That is, for the periods T12 and T13 in which the pulse signal (VP) has a high level, the transistor P2 is turned off, and the bias voltage (VB) is not supplied to the photodiode (PD). For the periods T12 and T13 in which the pulse signal (VP) has a high level, no current flows to the photodiode (PD).

When the recognition object contacts the sensor pixel, the voltage at the node N3 is less influenced by the pulse signal (VP) than the case in which the recognition object does not contact it. The transistor P2 may be maintained at the On state by the reset voltage VR2 at the On level. The bias voltage (VB) is supplied to the photodiode (PD), so the current continuously flows to the photodiode (PD) and the charges are stored in the storage capacitor (Cst).

For the period T4 in which the scan signal (S[i]) is at the On level, the charges stored in the storage capacitor (Cst) are transmitted to the sensor signal lead out circuit 400 through the data line (Dj), and the node N1 is reset with the voltage of the data line (Dj). When the reset voltage VR2 is at the On level, the amount of stored charges when the recognition object contacts the sensor pixel may be greater than the amount of stored charges when the recognition object does not contact it. Therefore, the difference between the data signals according to the contacting state increases to acquire a clear image.

The method for driving a sensor pixel circuit (SPXij_5) described with reference to FIG. 6 may be suitable for the optical sensing mechanism in a non total internal reflection (TIR) type (diffuse reflectance) by which more light comes from the ridge of the fingerprint and less light comes from the valley of the fingerprint when the recognition object is the fingerprint.

FIG. 5 and FIG. 6 illustrate that the pulse signal (VP) is equivalently supplied to the sensor pixel circuits (SPX), and the pulse signal may be supplied for each sensor pixel row.

Figure 9:
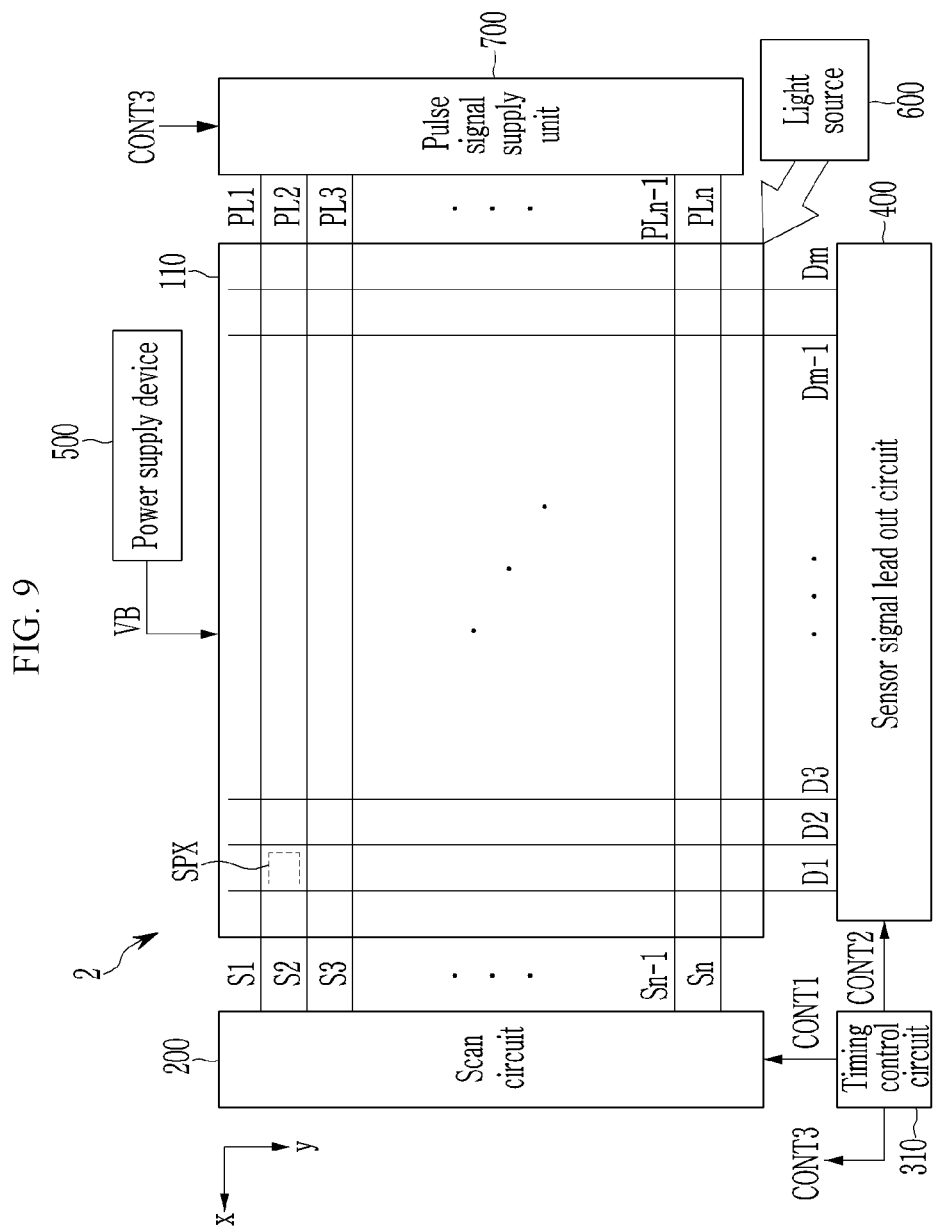
FIG. 9 shows a sensor device according to an embodiment.

FIG. 9 shows a sensor device according to an embodiment.

Compared to an embodiment described with reference to FIG. 1, the sensor device 2 further includes a pulse signal supply unit 700, and a sensor panel 110 further includes a plurality of pulse signal lines (PL1 to PLn). A timing control circuit 310 further generates a control signal (CONT3) for controlling the pulse signal supply unit 700, and the pulse signal supply unit 700 may generate a plurality of pulse signals (VP1 to VPn) according to the control signal (CONT3) and may supply them to a plurality of pulse signal lines (PL1 to PLn).

The scan circuit 200, the sensor signal lead out circuit 400, the power supply device 500, and the light source 600 correspond to the descriptions given with reference to FIG. 1, so no detailed descriptions thereof will be provided.

Figure 10:
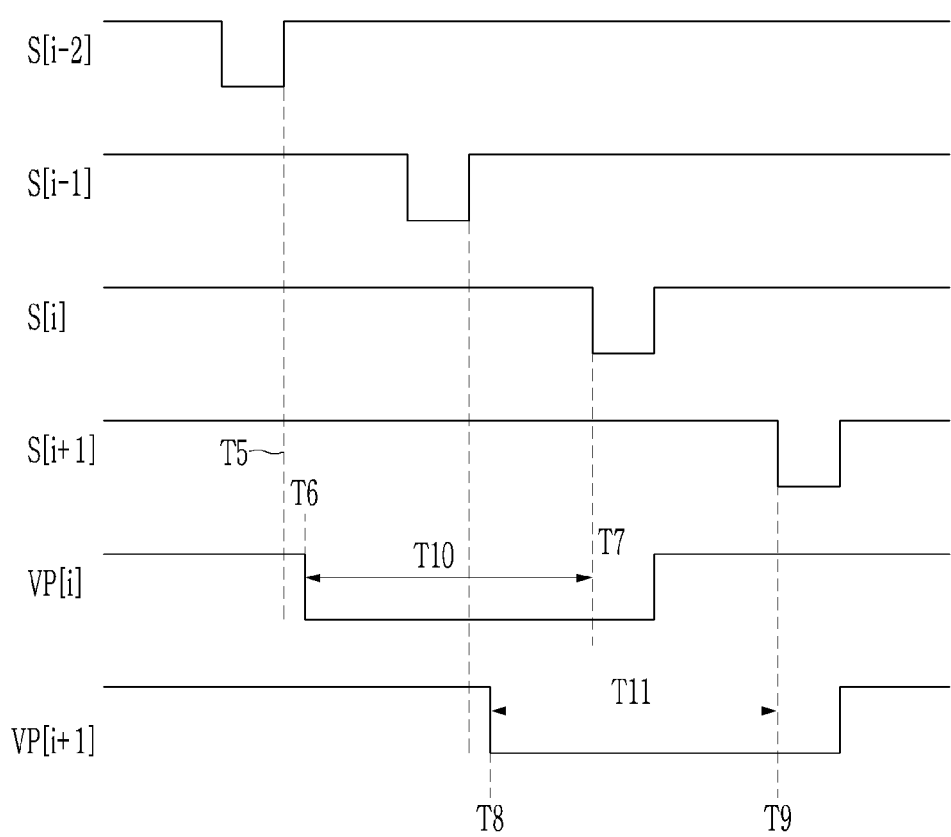
FIG. 10 shows a waveform diagram of pulse signals according to an embodiment.

FIG. 10 shows a waveform diagram of pulse signals according to an embodiment.

A plurality of scan signals (S[i−2], S[i−1], S[i], and S[i+1]) together with the pulse signal (VPi) supplied through the pulse signal line (PLi) positioned in the i-th sensor pixel row and the pulse signal (VPi+1) supplied through the pulse signal line (PLi+1) positioned in the (i+1)-th sensor pixel row are shown.

An operation of the sensor pixel circuit according to a pulse signal by using the sensor pixel circuit (SPXij_5) described with reference to FIG. 8 will now be described.

As shown in FIG. 10, the scan signal (S[i−2]) rises to the Off level at the time T5, and the pulse signal (VPi) falls to the low level at the time T6. In this instance, the reset voltage VR2 is a voltage at the Off level. In FIG. 10, the scan signal (S[i−2]) will be described to be the scan signal (S[d]) of the sensor pixel circuit (SPXij_5) described with reference to FIG. 8. That is, the reset voltage VR2 is applied to the node N3, and the pulse signal (VPi) is then changed.

When the recognition object does not contact the sensor pixel circuit (SPXij_5), the transistor P2 is turned on from the time T6 when the pulse signal (VPi) falls to the low level, the bias voltage (VB) is supplied to the photodiode (PD), and the storage capacitor (Cst) is charged by the current flowing to the photodiode (PD). The scan signal (S[i]) becomes the On level at the time T7, and the charges stored in the storage capacitor (Cst) are transmitted to the sensor signal lead out circuit 400 through the data line (Dj) for the On-level period of the scan signal (S[i]).

The scan signal (S[i−1]) rises to the Off level, and the pulse signal (VPi+1) falls to the low level at the time T8.

When the recognition object does not contact the sensor pixel circuit (SPXij_5), the transistor P2 is turned on from the time T8 when the pulse signal (VPi+1) falls to the low level, the bias voltage (VB) is supplied to the photodiode (PD), and the storage capacitor (Cst) is charged by the current flowing to the photodiode (PD). The scan signal (S[i+1]) becomes the On level at the time T9, and the charges stored in the storage capacitor (Cst) are transmitted to the sensor signal lead out circuit 400 through the data line (Dj) for the On-level period of the scan signal (S[i+1]).

Regarding the sensor pixel circuit in the i-th sensor pixel row, the charges are stored in the storage capacitor (Cst) for the period T10. Regarding the sensor pixel circuit in the (i+1)-th sensor pixel row, the charges are stored in the storage capacitor (Cst) for the period T11. As described, an accumulated time of respective sensor pixel rows may be adjusted by adjusting the On time of the transistor P4. The accumulated time may be increased when a period between the On time of the transistor P4 and the On time of the transistor P1 is controlled to be long.

Figure 11:
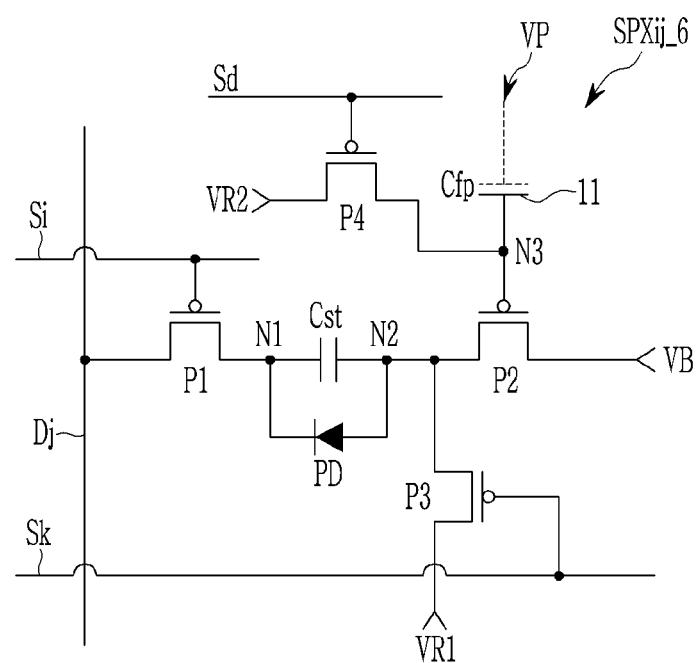
FIG. 11 shows a sensor pixel circuit according to an embodiment.

FIG. 11 shows a sensor pixel circuit according to an embodiment.

The sensor pixel circuit (SPXij_6) shown in FIG. 11 includes a transistor P3 for resetting the node N2 and a transistor P4 for resetting the node N3.

The transistor P4 may be turned on to reset the node N3, and the transistor P3 may be turned on to reset the node N2. Other operations correspond to the descriptions provided with reference to FIG. 4 to FIG. 6, so no detailed descriptions thereof will be provided.

Figure 12:
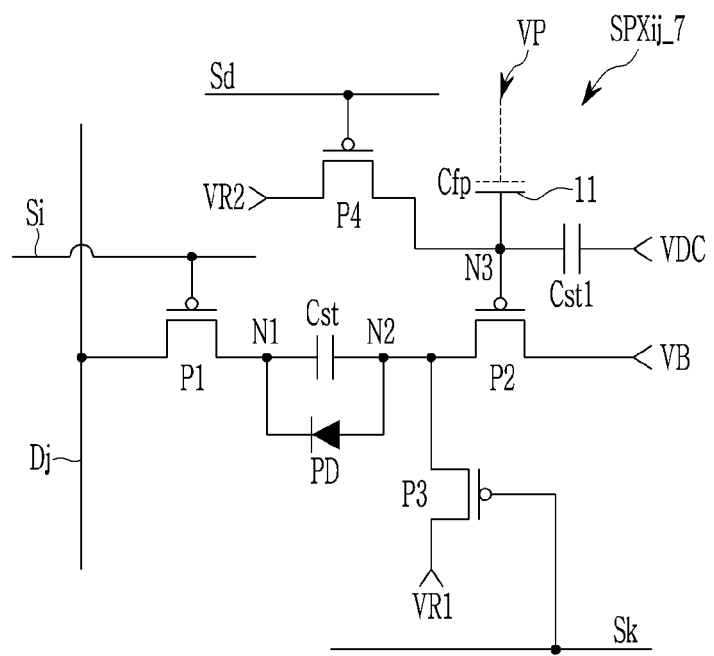
FIG. 12 shows a sensor pixel circuit according to an embodiment.

FIG. 12 shows a sensor pixel circuit according to an embodiment.

The sensor pixel circuit (SPXij_7) described with reference to FIG. 12 further includes a storage capacitor Cst1, compared to the sensor pixel circuit (SPXij_6) described with reference to FIG. 11, and the pulse signal (VP) is supplied to the recognition object. The storage capacitor Cst1 includes a first electrode connected to the node N3, and a second electrode for receiving a DC voltage.

The transistor P4 may be turned on to reset the node N3, and the transistor P3 may be turned on to reset the node N2. Other operations correspond to the descriptions provided with reference to FIG. 5 to FIG. 7, so no detailed descriptions thereof will be provided.

Figure 13:
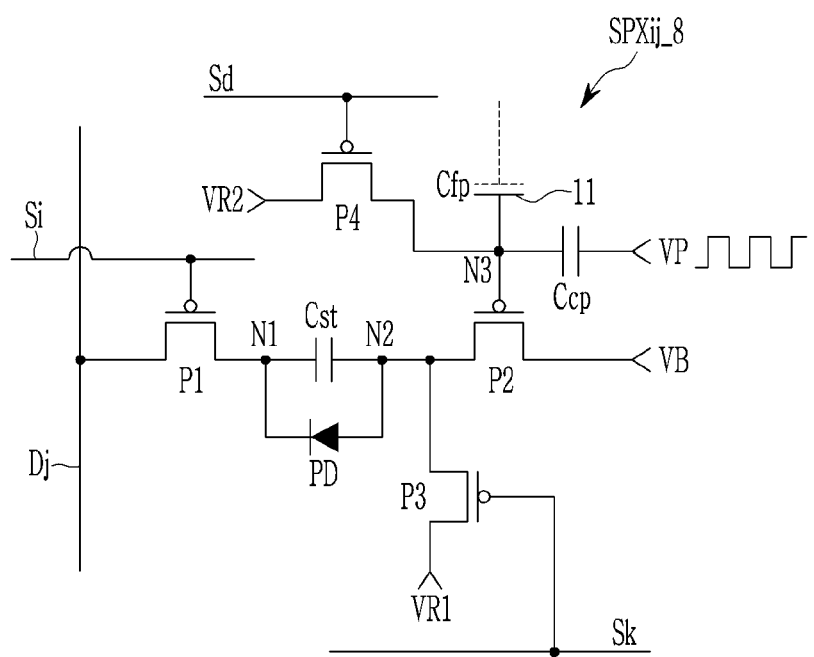
FIG. 13 shows a sensor pixel circuit according to an embodiment.

FIG. 13 shows a sensor pixel circuit according to an embodiment.

The sensor pixel circuit (SPXij_8) described with reference to FIG. 13 further includes a coupling capacitor (Ccp), compared to the sensor pixel circuit (SPXij_6) described with reference to FIG. 11, and the pulse signal (VP) is supplied to the coupling capacitor (Ccp). The coupling capacitor (Ccp) includes a first electrode connected to the node N3, and a second electrode for receiving the pulse signal (VP).

The transistor P4 may be turned on to reset the node N3, and the transistor P3 may be turned on to reset the node N2. Other operations correspond to the descriptions provided with reference to FIG. 5, FIG. 6, and FIG. 8, so no detailed descriptions thereof will be provided.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 1, 2: sensor device
100, 110: sensor panel
200: scan circuit 300, 310: timing control circuit
400: sensor signal lead out circuit
500: power supply device
600: light source
700: pulse signal supply unit

What is claimed is:

1. A sensor pixel circuit comprising:
a photodiode to which a current flows according to incident light;
a storage capacitor connected in parallel to the photodiode;
a first transistor for connecting a bias voltage and the photodiode by a contact of a recognition object; and
a second transistor for transmitting charges stored in the storage capacitor to a data line.

2. The sensor pixel circuit of claim 1, wherein
the first transistor includes a first end connected to an anode of the photodiode and a second end for receiving the bias voltage,
a sensing electrode connected to a control end of the first transistor is further included, and
the sensing electrode and the recognition object forms a sensing capacitor by a contact of the recognition object.

3. The sensor pixel circuit of claim 2, further comprising
a third transistor for resetting a voltage at a first node on which the first end of the first transistor is connected to an anode of the photodiode with a reset voltage for making the photodiode an open circuit.

4. The sensor pixel circuit of claim 3, wherein
the third transistor includes a first end connected to the first node and a second end for receiving the reset voltage, and
the current flowing to the photodiode is charged in the storage capacitor by a contact of the recognition object for a period from a turn-off time of the third transistor to a turn-on time of the second transistor after the turn-off time of the third transistor.

5. The sensor pixel circuit of claim 2, further comprising
a fourth transistor for resetting a voltage at a second node on which a control end of the first transistor is connected to the sensing electrode.

6. The sensor pixel circuit of claim 5, wherein
the fourth transistor includes a first end connected to the second node and a second end for receiving a reset voltage, and
for an On period of the fourth transistor, the second node becomes the reset voltage, and the first transistor is switched according to a pulse signal supplied to the recognition object by a contact of the recognition object.

7. The sensor pixel circuit of claim 6, wherein
when the reset voltage is an On level voltage of the first transistor, the second node is reset with the reset voltage, and
the pulse signal is changed to a level for turning off the first transistor.

8. The sensor pixel circuit of claim 6, wherein
when the reset voltage is an Off level voltage of the first transistor, the second node is reset with the reset voltage, and
the pulse signal is changed to a level for turning on the first transistor.

9. The sensor pixel circuit of claim 5, further comprising
a first storage capacitor including a first electrode connected to the second node and a second electrode for receiving a DC voltage.

10. The sensor pixel circuit of claim 5, further comprising
a coupling capacitor including a first electrode connected to the second node and a second electrode for receiving a pulse signal.

11. The sensor pixel circuit of claim 10, wherein
the fourth transistor includes a first end connected to the second node, and a second end for receiving a reset voltage, and
for an On period of the fourth transistor, the second node becomes the reset voltage and the first transistor is switched according to the pulse signal.

12. The sensor pixel circuit of claim 11, wherein
when the reset voltage has an On level voltage of the first transistor, the second node is reset with the reset voltage, and
the pulse signal is changed to a level for turning off the first transistor.

13. The sensor pixel circuit of claim 11, wherein
when the reset voltage is an Off level voltage of the first transistor, the second node is reset with the reset voltage, and
the pulse signal is changed to a level for turning on the first transistor.

14. A sensor device comprising:
a sensor panel including a plurality of sensor pixels;
a gate driving circuit for supplying a scan signal to a plurality of sensor pixel rows through a plurality of scan lines; and
a sensor signal lead out circuit for receiving a plurality of data signals supplied from the sensor pixels through a plurality of data lines,
wherein one sensor pixel circuit of the sensor pixels includes
a photodiode to which a current flows according to incident light,
a storage capacitor connected in parallel to the photodiode,
a first transistor for connecting a bias voltage and the photodiode by a contact of a recognition object, and
a second transistor synchronized with a scan signal transmitted through a corresponding one of the scan lines and transmitting charges stored in the storage capacitor to a corresponding one of the data lines.

15. The sensor device of claim 14, wherein
the sensor pixel circuit further includes
a third transistor for resetting a voltage at a second node on which a control end of the first transistor is connected to the sensing electrode, and
a coupling capacitor including a first electrode connected to the second node and a second electrode for receiving a pulse signal.

16. The sensor device of claim 15, further comprising
a plurality of pulse signal lines for supplying corresponding pulse signals to the respective sensor pixel rows.

* * * * *